Jan. 8, 1924.
P. E. CRUTCHFIELD
POISON DISTRIBUTOR
Filed Sept. 27, 1921
1,480,154
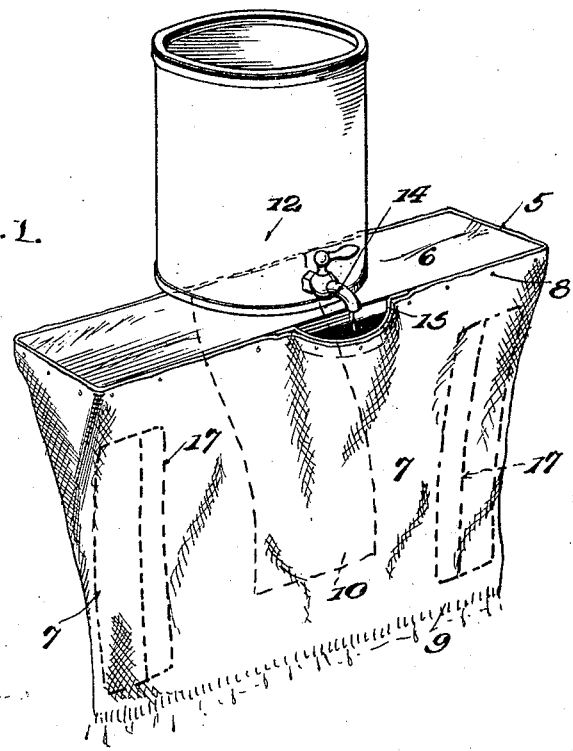
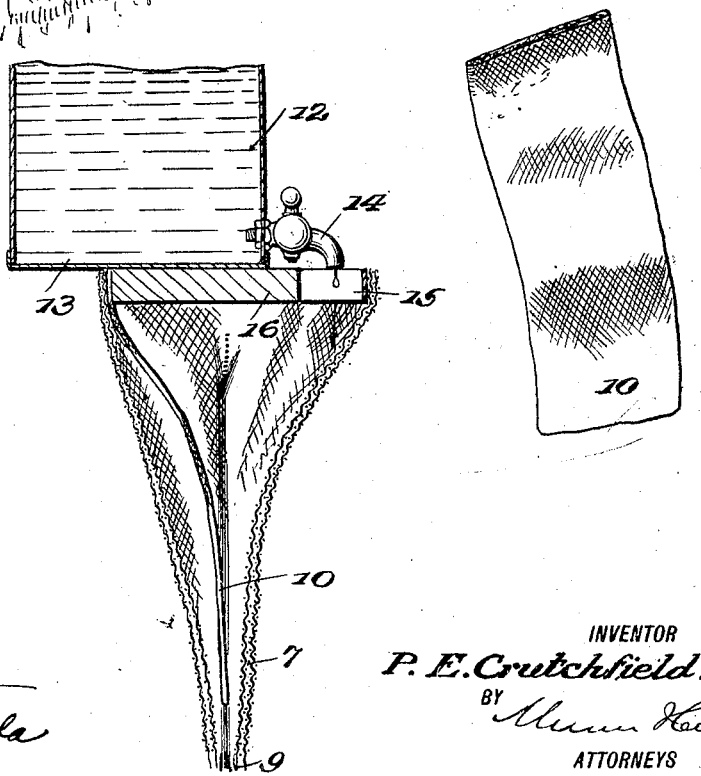
WITNESSES
INVENTOR
P. E. Crutchfield.
BY
ATTORNEYS Patented Jan. 8, 1924.

1,480,154

UNITED STATES PATENT OFFICE.

PHILLIPS EUGENE CRUTCHFIELD, OF CONYERS, GEORGIA, ASSIGNOR OF ONE-THIRD TO CHAS. E. REAGAN AND ONE-THIRD TO REUBEN L. BLACKWELL, BOTH OF CONYERS, GEORGIA.

POISON DISTRIBUTOR.

Application filed September 27, 1921. Serial No. 503,686.

*To all whom it may concern:*

Be it known that I, PHILLIPS E. CRUTCHFIELD, a citizen of the United States, and a resident of Conyers, in the county of Rockdale and State of Georgia, have invented certain new and useful Improvements in Poison Distributors, of which the following is a specification.

This invention relates to poison distributors especially adapted for use in connection with dispensing liquid poisons employed for killing insects on cotton plants, potato plants and the like.

An important object is to provide a poison distributor having simple means whereby the poison upon being discharged from the container is distributed over a wide area for supplying the entire plant with the poison and thereby killing the destructive insects on the same.

Further, the invention aims to provide a poison distributor having simple means whereby the same may be secured to a plow beam or stock or other convenient support, or used as a hand distributor.

A further object is to provide a poison distributor which is simple to operate, of highly simplified construction, and cheap to manufacture.

Other objects and advantages of the invention will be apparent during the course of the following description.

In the accompanying drawing,

Figure 1 is a perspective of the improved poison distributor.

Figure 2 is a vertical detail sectional view through the same.

Figure 3 is a perspective of a distributor tongue embodied in the invention.

In the drawing wherein for the purpose of illustration is shown a preferred embodiment of the invention the numeral 5 generally designates the improved poison distributor which consists of a top plate or board 6 to which a fabric body 7 is secured to define a receiving and distributing member. The fabric body 7 is secured to the edges and ends of the board 6 by means of fastening devices 8 and is preferably a loosely woven material having a high saturation point so as to hold a large quantity of the liquid poison for contact with the cotton or other plants.

In carrying out the invention the fabric body 7 has its lower end open and preferably formed with a fringe 9 from which the poison liquid may drip onto the plants. The poison liquid upon entering the open-ended poison distributor spreads over the same and subsequently drips out through the lower end of the same for combating the insects infesting the plants.

If desired a distributor tongue 10 may be extended downwardly, crosswise, or in any other direction through the poison receiver and distributor and is secured at its upper end to the rear longitudinal edge of the board 6 by certain of the fastening devices 8. As illustrated in Figures 1 and 2 the distributor tongue 10 which is of a suitable absorbent material terminates at a point above the open lower end of the receiver.

A poison liquid container 12 is provided with a bottom 13 secured upon the intermediate portion of the top board 6 and the said liquid container 12 has a spout or cock 14 which discharges the liquid into the upper end of the liquid receiver and distributor. A strap of leather or other material 15 has its ends secured to the forward longitudinal edge of the board 6 and its intermediate portion bowed outwardly beneath the cock 14 to define an inlet opening for the liquid.

With reference to Figure 1 it will be observed that the opposite sides of the receiver and distributor cloth 7 may be joined by rows of stitching 17 adjacent the vertical edges of the same so as to stiffen and reinforce the said edges.

It will be seen that when the liquid enters the open end of the receiver and distributor it will spread over the surface of the same by capillary attraction and when it reaches the saturation point it will drip from the lower end of the member 7. Also the liquid which happens to drip on the tongue 10 will be spread by capillary attraction and in this manner the entire member 7 will be supplied with the poison liquid. However, prior to the receiver 7 reaching the saturation point the liquid contained in the receiver will contact with the plants and thereby destroy the boll weevil.

In use the improved poison distributor may be applied to a plow stock or similar instrument and may be adjusted to different heights of plants if desired. Further the distributor may be used as a hand distributor for the purpose of dispensing poison.

I claim:—

1. A poison distributor comprising a top board, a fabric body secured to the top board and constituting an open-ended receiver and distributor adapted for the reception of a poison liquid, a poison container mounted on said board, and a distributing tongue extending through said receiver and distributor.

2. A poison distributor comprising a top board, a fabric body secured to the top board and constituting an open-ended receiver and distributor adapted for the reception of a poison liquid, a poison container mounted on said board, means controlling the flow of liquid from said container to said receiver, and a strap secured to said board and having its intermediate portion bowed outwardly to define an inlet opening for said receiver, the upper end of said receiver being secured to said strap.

PHILLIPS EUGENE X CRUTCHFIELD.
his mark

Attest:
HILLYER STILL,
G. C. SIMS.